United States Patent [19]

Neher

[11] Patent Number: 5,186,025
[45] Date of Patent: Feb. 16, 1993

[54] PLUSH OR PILE KNITTED FABRIC AND CIRCULAR KNITTING MACHINE FOR THE PRODUCTION THEREOF

[75] Inventor: Paul Neher, Messtetten, Fed. Rep. of Germany

[73] Assignee: SIPRA Patententwicklungs-und Beteiligungsgesellschaft mbH, Albstadt, Fed. Rep. of Germany

[21] Appl. No.: 572,472

[22] Filed: Aug. 23, 1990

[30] Foreign Application Priority Data

Aug. 23, 1989 [DE] Fed. Rep. of Germany ....... 3927815

[51] Int. Cl.⁵ .......................... D04B 9/12; D04B 1/02
[52] U.S. Cl. ........................................ 66/9 R; 66/194
[58] Field of Search .................... 66/9 R, 194

[56] References Cited

U.S. PATENT DOCUMENTS

| 2,379,852 | 7/1945 | Nebel | 66/194 |
| 2,710,527 | 6/1955 | Radin | 66/194 X |
| 2,715,824 | 9/1955 | Krauss et al. | 66/194 X |
| 3,023,596 | 3/1962 | Hill | 66/194 |
| 3,111,829 | 11/1963 | Artzt | 66/194 |
| 4,612,784 | 9/1986 | Plath | 66/9 R |
| 4,633,683 | 1/1987 | Schmidt | 66/9 R |

FOREIGN PATENT DOCUMENTS

| 476878 | 9/1969 | Switzerland | 66/194 |
| 1217953 | 3/1986 | U.S.S.R. | 66/194 |

Primary Examiner—Werner H. Schroeder
Assistant Examiner—John J. Calvert
Attorney, Agent, or Firm—Michael J. Striker

[57] ABSTRACT

The invention relates to a plush or pile knitted fabric comprising a basic knit including a multiplicity of courses and plush yarns or pile fibres which are bound into the basic knit. The basic knit comprises a plain knit formed with at least one basic yarn (1). In accordance with the invention at least one second basic yarn (5) is incorporated into each course in such a way that it is knitted to form stitches (19) at least in selected courses formed with the first basic yarn (1), or forms single-yarn float loops (7) which are disposed between same.

18 Claims, 11 Drawing Sheets

PLUSH OR PILE KNITTED FABRIC AND CIRCULAR KNITTING MACHINE FOR THE PRODUCTION THEREOF

BACKGROUND OF THE INVENTION

The invention relates to a plush or pile knitted fabric which has a basic knitwear containing a plurality of courses and plush yarns or pile fibres which are bound into same, wherein the basic knitwear comprises a plain knitted knitwear formed with at least one first ground or basic yarn and wherein at least one second ground or basic yarn is incorporated into the basic knitwear. The invention also relates to a circular knitting machine for the production of such plush or pile knitted fabrics and comprising a needle cylinder fitted with knitting needles, a sinker ring fitted with sinkers, and at least one knitting system which includes a basic yarn guide for feeding the first basic yarn to all knitting needles, a second basic yarn guide for feeding the second basic yarn and at least one plush yarn guide or a carding device for feeding a plush yarn or the pile fibres.

Plush or pile knitted fabrics have a basic knitwear (i.e. basic knit) and pile fibres or plush loops which are bound thereinto. Since they are used in various ares, in particular in the area of the furniture or motor vehicle industry (upholstery covers) and the textile industry (clothing, decorative materials, technical materials), the requirements which are made in regard thereto vary widely.

For providing a high production speed and the use of reliable knitting machines which are of a simple structure, plush and pile knitted fabrics are preferably provided with a plain (right-left) basic knit. For the production of such basic knits, it is possible to use single-section knitting machines, in particular circular knitting machines, which have only one needle bed (for example a needle cylinder), a sinker bed (for example a sinker ring), and in addition the devices required for feeding plush yarns or pile fibres (see German laid-open applications (DE-OS 31 45 307 and 23 43 886).

Plain basic knits are not suitable for all purposes of use of plush or pile knitted fabrics because of their high level of stretchability, in particular transversely with respect to the wales, and their the lack of anti-ladder capacity. That applies even when, for predominatly visual reasons, each course of the basic knit is composed of sub-courses or course portions, and the basic yarns at successive knitting systems are each fed only to a part of the knitting needles and are set back in regard to the other knitting needles so that each full course is composed of a plurality of sub-courses (see for example German patent specifications Nos. 664 750 and 671 801, EOP 0 051 059 and U.S. Pat. No. 2,710,527). In addition that kind of basic knit is provided in particular when, in dependence on the specific type of knitting machine, it is not possible to associate plush yarns or pile fibres of preselected properties, for example colours, with any desired stitch in a course. The formation of sub-courses then makes it possible for the plush yarns or pile fibres of the same properties to be bound into a respective one of those sub-courses. A consequence thereof is generally lower production speeds and lesser plush yarn or pile fibre densities.

In order to improve the mechanical properties of plush knitted fabrics it is known to provide a double-surface basic knit containing right-right courses (see German published specification (DE-AS) No. 26 37 645). However that is possible only with a complicated machine structure and a low level of density in regard to the plush loops.

It is also known in relation to plush and pile knitted fabrics for a filling yarn (i.e. a backing yarn or a laying-in thread) to be bound in some or all courses of the basic knit (see German laid-open applications (DE-OS) Nos. 18 06 292 and 31 36 670, and EP 0 051 059). Filling yarns of that kind admittedly serve more for the purpose of binding in the plush loops or pile fibres more firmly into the basic knit or consolidating the basic knit, and less for improving, altering or controlling the mechanical properties of a plush or pile knitted fabric. Therefore it has also already been described in this connection (see German laid-open application (DE-OS) No. 2804068) that the stretchability of basic knits may be substantially influenced by the incorporation of filling yarns only when a lower degree of stretchability is imparted to the filling yarns than the stitch-forming basic yarns, in order thereby to limit the transverse stretching of the basic knit to a preselected value. That however is not always desirable for the production of plush or pile knitted fabrics. This is applicable to basic knitting configurations which are produced by the basic yarns formed into stitches only where plush yarns or pile fibres are bound in, while in the other regions the basic yarns are bound in the manner of filling yarns (EP 0 051 059 and 0 072 425). In addition, knitting machines on which such basic knits can be produced would have to be provided with additional patterning arrangements if they are also to be suitable for the production of high-low patterns. Otherwise no needle would be selected for knitting purposes in those zones in which no plush yarns or pile fibres are to be supplied.

In addition, the production of colour patterns in plush or pile knitted fabrics, it is known for floating parts of the basic yarns to be bound into the basic knit by the additional formation of tuck loops or stitches (German laid-open applications (DE-OS) Nos. 24 23 700 and 30 24 705). However floating stitches of that kind only occur when in each knitting system only those needles which are to receive a plush yarn are extended, so that each pattern row is formed by a plurality of sub-rows comprising basic and plush yarns. Therefore the binding off of basic yarn float loops can at any event afford advantages where, due to the system involved, the basic knit has float loops. In contrast, binding procedures of that kind are meaningless in relation to all plush or pile knitted fabrics which, by virtue of the system involved, are produced with a plain right-left basic knit throughout.

Processes are also known which are performed to provide a higher level of plush or pile fibre density, at least in a zone-wise manner, by varying or controlling the basic knit configuration or influencing the properties of the basic knit in particular in those sections in which in accordance with a pattern no plush yarns or pile fibres are to appear, as applies in particular in regard to high-low patterns (German laid-open application (DE-OS) No. 33 05 895). However that results in the production of basic knits which, particularly in the transitional regions between two colour or high-low areas, have an uneven or disturbed effect and do not have any serious advantages over plain right-left basic knits. Apart from that, the production of such fabrics requires knitting machines which, apart from the patterning arrangements intended for needle selection in accordance with the pattern, have patterning arrangements intended for controlling the basic knit configuration.

Also known is a basic knit for plush knitted fabrics, which consists of two basic yarns throughout (German laid-open application (DE-OS) No. 19 43 345 and German utility mode No. 1 964 317). The properties of a plain right-left fabric, due to the principle involved, also cannot be affected thereby. Furthermore that known basic knit does not improve the mechanical properties of the knitware, but for firmly anchor the plush yarns between the two basic yarns as, in contrast to other known processes, the plush yarns are not made into stitches.

Finally it is known (German laid-open application (DE-OS) No. 27 19 578) for reinforcing and/or plush yarns to be additionally bound into a plain basic knit in order thereby to produce selected markings or patterning effects. However such processes have not been used hitherto for providing a plush or pile knitted fabric produced on a production machine, with a unitary basic knit throughout. On the contrary, in the production of socks or stockings and other articles of clothing or parts thereof, they serve for producing particular wearing properties or visual effects, in a zone-wise or section-wise manner. The same consideration also applies in regard to the numerous known plating or backing patterning effects (see for example German published specification (DE-AS) No. 1 056 774) which hitherto have been used exclusively in relation to knitted fabrics without plush yarns or pile fibres.

SUMMARY OF THE INVENTION

The object of the invention is a plush or pile knitted fabric which includes a basic knit which, in comparison with a plain right-left knitted fabric, is more ladder-proof, if required, is less stretchable, and can be produced in a substantially free configuration in regard to its mechanical properties, pattern options and production costs. Another object of the invention is to provide a circular knitting machine for the production of such plush or pile knitted fabrics.

To solve that problem, the plush or pile knitted fabric according to the invention, of the kind set forth in the preamble of this specification, is produced with the second ground or basic yarn being knitted at least in selected courses together with the first ground or basic yarn to form stitches or float loops therebetween.

The circular knitting machine for the production of such a plush or pile knitted fabric, according to the invention is equipped with a system having a selector device for inserting the second basic yarn into selected knitting needles.

The invention provides, for example, the advantage that the basic knit is substantially less stretchy than a conventional plain R/L-knit if the second basic yarn is 1:1-backed (i.e. floated) and the float loops are arranged in mutually displaced relationship from one course to another. In that way, the basic knit is stabilised and rendered suitable in particular for high-low patternings, because it is sufficiently stable even in the regions which are free from plush yarns or pile fibres. In addition the invention provides an enhanced level of anti-ladder capacity in the event of over-stretching or when subjected to other mechanical influences. In addition there is a pleasing appearance at the front side of the plush or pile fibre knitted fabric in those zones in which, in accordance with the pattern, no plush yarns or pile fibres are bound in. In that connection the new basic knit restricts neither the pattern options nor the density of the plush yarns or pile fibres which are additionally bound in. It is also advantageous that the basic knit configuration can be produced on known knitting machines, in particular circular knitting machines, which are intended for the production of plush or pile knitted fabrics, after minor structural alterations, so that there is no need for new expensive machine constructions. The higher level of yarn consumption caused by the second basic yarn and the space required on the knitting machine for feeding same, which results in a reduced production capacity, can be accepted in the light of the above-mentioned advantages. That applies in particular in regard to the production of those plush or pile knitted fabrics provided with high-low patterning, which are to have zones of comparatively large area without plush yarns or pile fibres.

The present invention both as to its construction so to its mode of operation, together with additional objects and advantages thereof, will be best understood from the following detailed description of the preferred embodiments when read with reference to the accompanying drawings.

DETAILED DESCRIPTION OF THE PREFERRED EMBODIMENTS

Figure 1A:
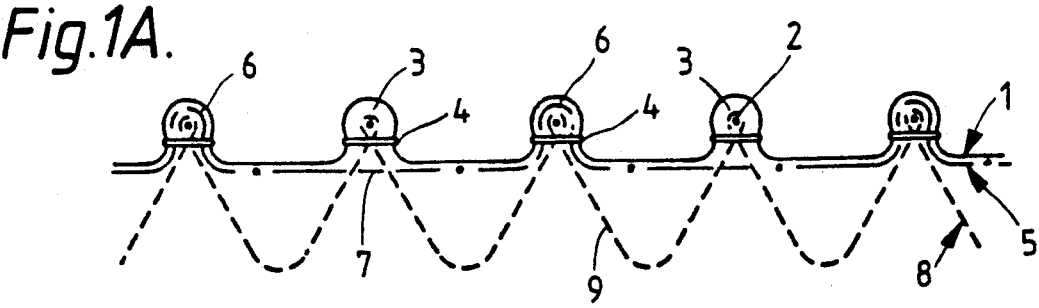
FIGS. 1A and 1B are diagrammatic views of two courses of a plush knitted fabric according to the invention without patterning.
Figure 1B:
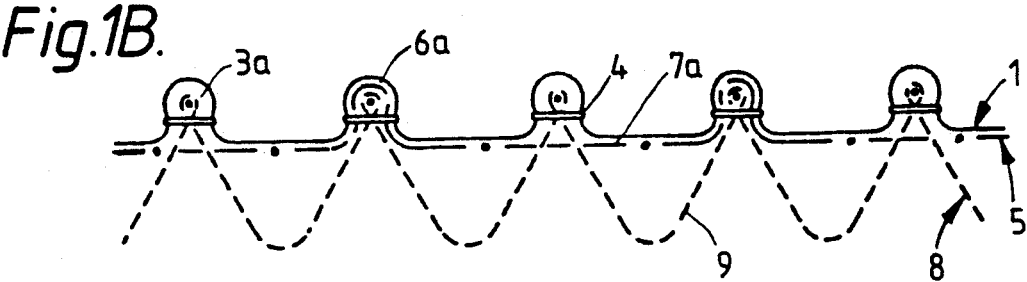

FIG. 1 shows a plush knitted fabric according to the invention, by means of the example of a single-colour full plush fabric. In a first course A a first basic or ground yarn 1 (represented in each case by a solid line) forms a stitch or loop 3 on each diagrammatically illustrated knitting needle 2 of a knitting machine. The respective previously formed stitches are indicated by reference numeral 4. In the same course A a second basic or ground yarn 5 (indicated in each case by a dash-dotted line) forms a stitch or loop 6 on each second knitting needle 2, while between them is a respective float loop 7 which passes the stitches 3. In addition, in the course A a plush yarn 8 (indicated in each case by a broken line) is involved at each knitting needle 2 in the formation of the respective stitches 3 and 6, while therebetween it is formed into longer plush loops 9. The course A therefore alternately contains the three-yarn stitches 6 formed from the two basic yarns 1 and 5 and the plush yarn 8, and the stitches 3 which are only formed from the basic yarn 1 and the plush yarn 8.

In the course B the basic yarn 1 and the plush yarn 8 are knitted in exactly the same way as in the course A, to form stitches 3a and 6a. In the course B, as in the course A, the second basic yarn 5 is alternately formed into stitches 6a and formed as a float loop 7a. The only difference is that the float loops 7a are each displaced by a needle 2 relative to the float loops 7 of the course A. The same applied in relation to the stitches 3, 3a and 6, 6a.

The two basic yarns 1 and 5 therefore together form a basic knit into which the plush yarns 8 are incorporated, in which respect the basic yarn 1, when considered on its own, forms a plain single-surface right-left basic knit while the basic yarn 5, when considered on its own, forms a basic knit with a 1:1-backing pattern with simultaneous displacement from one course to another. That generally results in a basic knit with a comparatively low degree of stretchability, in particular transversely with respect to the wales, and with an elevated degree of anti-laddering.

Figure 2A:
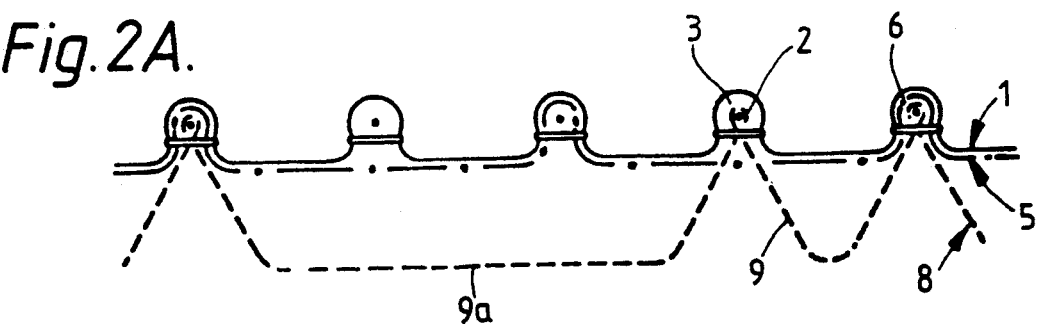
FIGS. 2A and 2B are diagrammatic views of two courses of a plush knitted fabric according to the invention with high-low patterning.
Figure 2B:
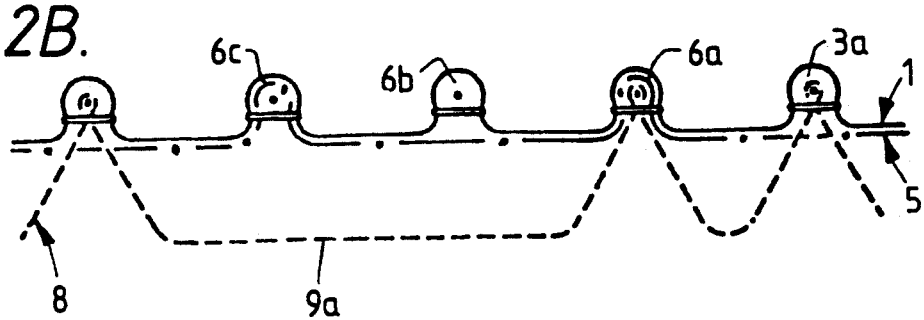

In the embodiment shown in FIG. 2 the basic knit formed from the basic yarns 1 and 5 is of the configuration shown in FIG. 1. In contrast the plush yarn 8 is only made into a stitch 3, 3a or 6, 6a by selected needles 2 in each case. In that way, depending on the selection of the plush yarn 8, the arrangement may involve single-yarn stitches 6b only comprising the basic yarn 1 and double-yarn stitches 6c which only consist of the two basic yarns 1 and 5 and which are bridged over by float loops 9a of the plush yarn. After the usual shearing operation in which the plush loops 9 and the float loops 9a are cut open, the stitches 6b and 6c form zones in which there are no plush yarns, as is conventional practice in relation to high-low patterns.

Figure 3A:
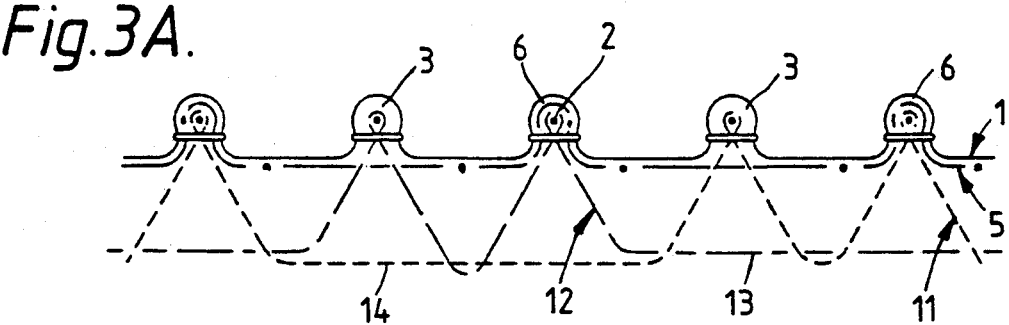
FIGS. 3A and 3B are diagrammatic views of two course of a plush knitted fabric according to the invention with a two-colour Jacquard patterning.
Figure 3B:
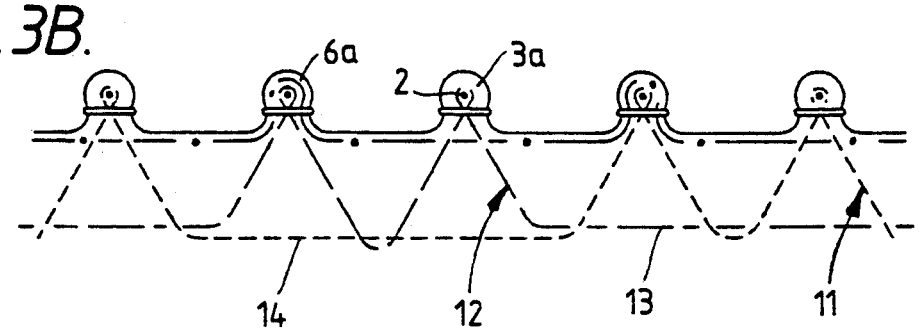

The embodiment shown in FIG. 3 concerns a patterned full plush fabric. While the basic knit is of the configuration shown in FIGS. 1 and 2, the stitches 3, 3a and 6, 6a, in accordance with the pattern, are formed from one of two plush yarns 11 and 12 respectively which can have different properties, for example colours, yarn quality or the like. In that arrangement the plush yarn 12 occurs in the form of a float loop 13 at the location where the plush yarn 11 forms a stitch while the plush yarn 11 is always in the form of a float loop 14 where the plush yarn 12 forms a stitch. After the shearing operation by which in particular the float loops 13 and 14 are removed, the plush yarns 11 and 12 therefore form zones with different properties. As shown in FIG. 3, that involves a full plush fabric as each individual knitting needle 2 knits one of the two plush yarns 11 and 12.

Figure 4A:
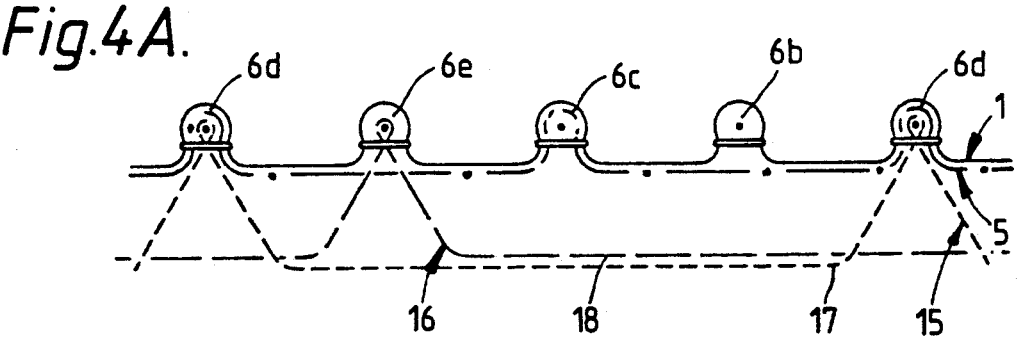
FIGS. 4A and 4B are diagrammatic views of two courses of a plush knitted fabric according to the invention with high-low and two-colour Jacquard patterning.
Figure 4B:
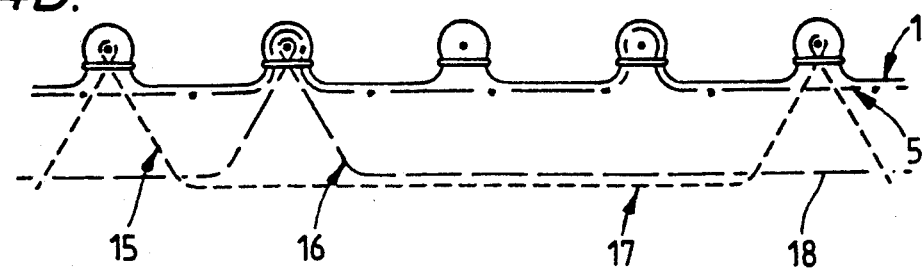

FIG. 4 shows a plush knitted fabric with combined high-low and for example colour patterning when using the same basic knit as in FIGS. 1 to 3. In the course A two different plush yarns 15 and 16 are partly made into stitches 6d and 6e respectively and partly into float loops 17 and 18 respectively. Unlike FIG. 3 however, a plush yarn 15, 16 is not also included in each stitch so that, as in FIG. 2, the fabric has single-yarn stitches 6b consisting only of the basic yarn, double-yarn stitches 6c consisting only of the two basic yarns 1 and 5, and treble-yarn stitches 6d consisting of all three yarns. After the shearing operation, a respective zone consisting only of the basic knit appears on the front side of the plush knitted fabric at the location where the float loops 17 and 18 overlap while, where the plush yarns 15 and 16 have been formed into stitches, there are zones with per se any colour patterning or the like.

Figure 5A:
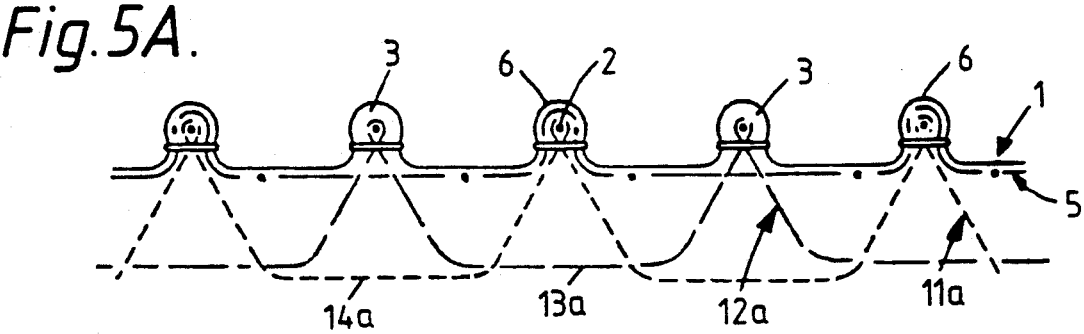
FIGS. 5A and 5B are diagrammatic views of two courses of a plush knitted fabric according to the invention with a two-colour plush yarn patterning of 1:1 and displaced configuration, FIGS. 6 and 7 each show a section of a plush knitted fabric according to the invention with two-colour Jacquard patterning before and after the shearing operation.
Figure 5B:
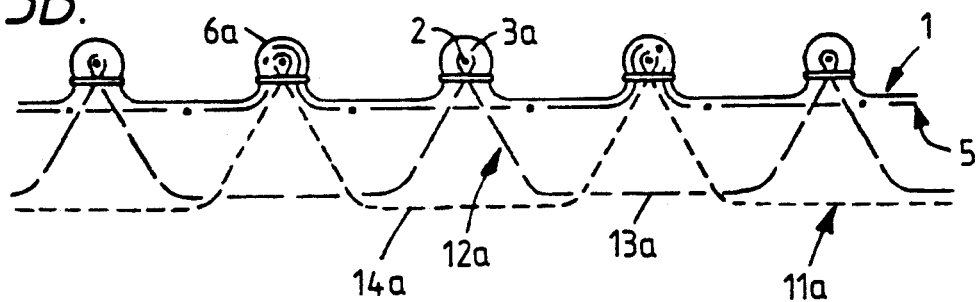

FIG. 5 shows a particularly compact and heavy plush knitted fabric which is of a similar configuration to FIG. 3 and which represents a two-colour full plush fabric. The stitches 3, 6 and 3a, 6a are formed therein in each course A and B in the 1:1 knitting mode alternately from one of two plush yarns 11a and 12a respectively. In that arrangement the plush yarn 12a (11a) always occurs as a float loop where the plush yarn 11a (12a) forms a stitch so as to produce long plush loops 13a and 14a which are each extended over a stitch. In that arrangement the plush yarns 11a and 12 may have the same properties or different properties such as colours, whereby it is possible to produce mixed or hybrid effects. The long plush loops 13a and 14a are each displaced by a stitch in mutually successive courses A and B. If the fabric is not subjected to a shearing operation, there is the advantage that the courses of the basic knit are covered by the long plush loops and therefore do not appear when the fabric is bent, as could be the case with the fabric shown in FIG. 1. Patterns other than a 1:1 pattern are also possible with that arrangement.

Figure 6:
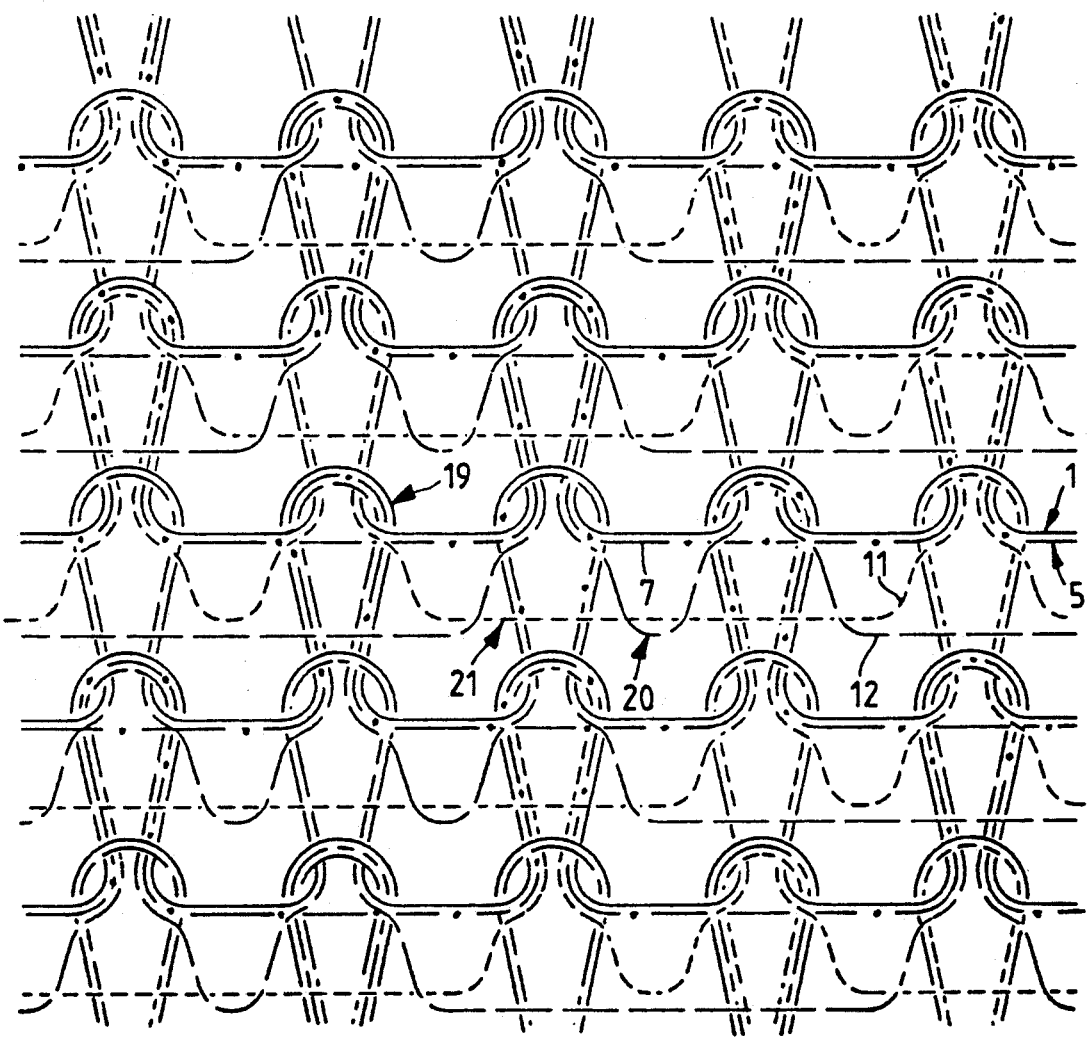
Figure 7:
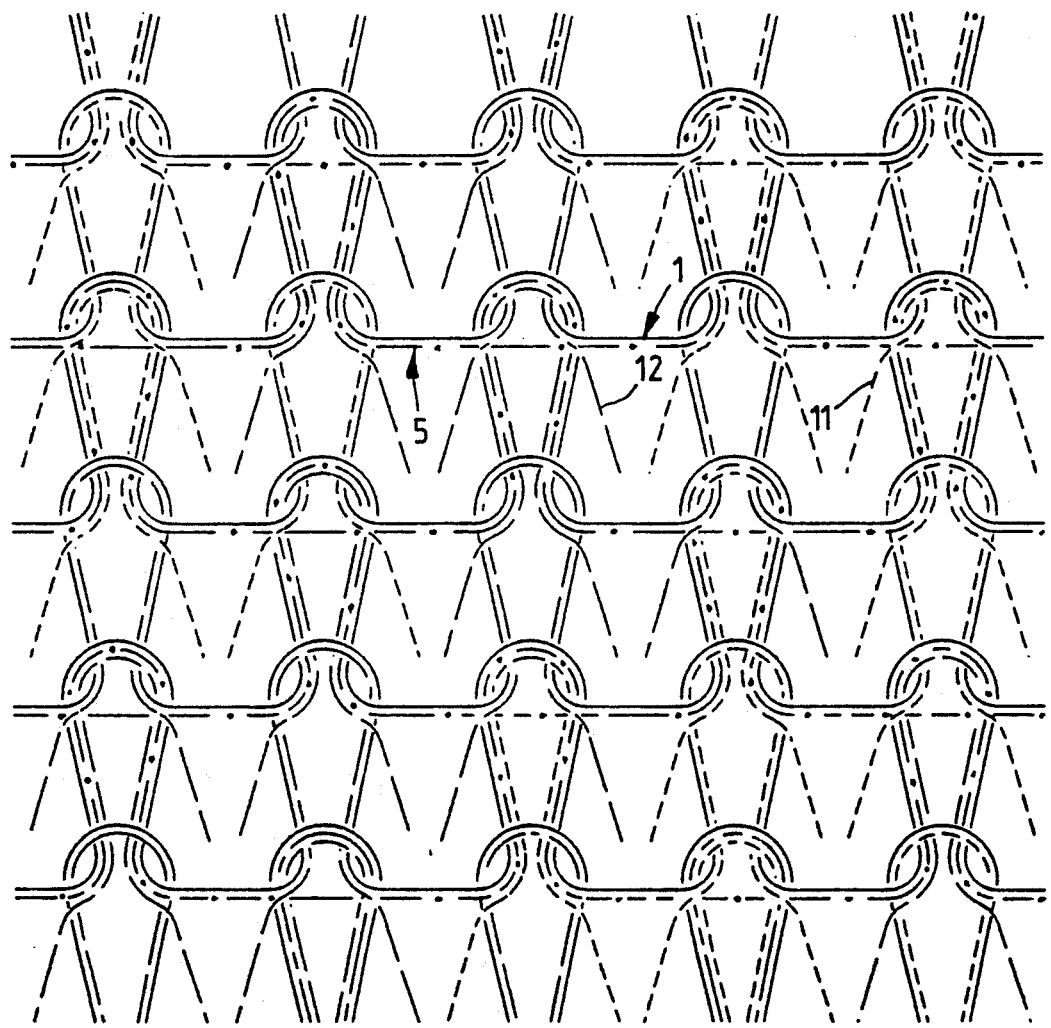

FIG. 6 shows a section consisting of five courses of a plush knitted fabric produced as shown in FIG. 3. The yarns 1 and 5 form the described basic knit while the plush yarns 11 and 12 are formed in accordance with the pattern into stitches 19 and plush loops 20 or float loops 21. After the shearing operation which cuts open the plush loops 20 and removes the float loops 21, the result is the plush knitted fabric shown in FIG. 7. In that connection it will be appreciated that the basic yarns 1 and 5 do not always have to be the same basic yarns. If, for the production of the plush knitted fabric, a circular knitting machine with a plurality of systems or groups of systems is used and in that respect each of the courses shown for example in FIGS. 6 and 7 is produced in another group of systems, it will be appreciated that in each group of systems different basic yarns 1 or 5 with the same or also different properties are used.

Figure 8:
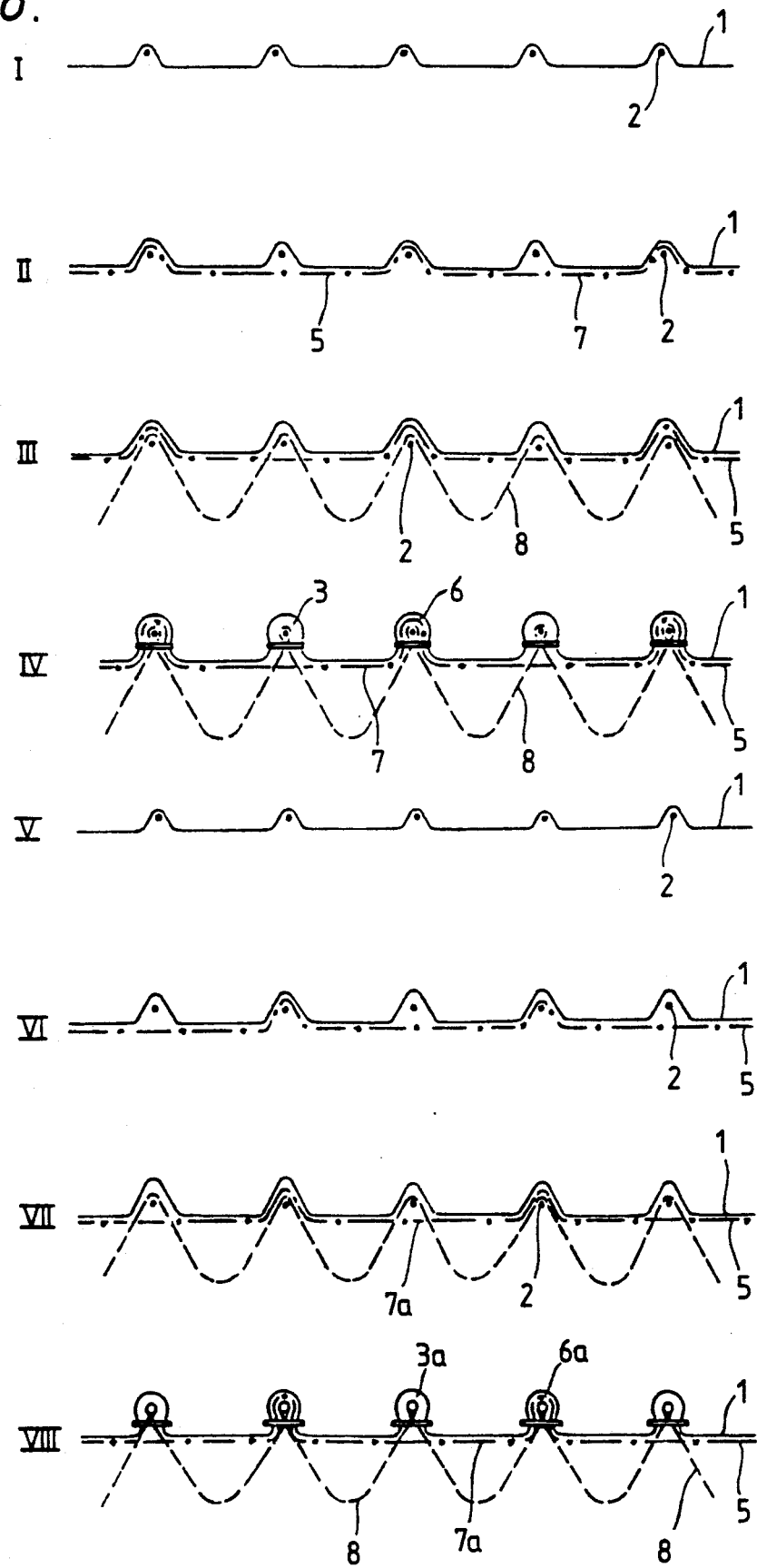
FIG. 8 is a yarn run representation over two groups each of four knitting systems of a circular knitting machine for the production of the plush knitted fabric shown in FIG. 1.

Production of the plush knitted fabric shown in FIG. 1 can be seen from FIG. 8 by reference to the example of a yarn run representation in a circular knitting machine (for example U.S. Pat. No. 4,612,784) which is suitable for the production of plush knitted fabrics and which includes a plurality of systems or system sections distributed at the periphery of a needle cylinder. In that situation the basic yarn 1 is presented in a first system section I to all knitting needles 2. The basic yarn 5 is additionally supplied to each second needle 2 in the system section II. In the system section III the plush yarn 8 is additionally introduced into each needle 2. Finally in the fourth system section IV a two-yarn or three-yarn stitch 3, 4 is formed with all needles 2. In the next system section V the basic yarn 1 is again fed to all needles 2. In the system section VI the basic yarn 5 is fed to those needles 2 to which the basic yarn 5 was not fed in system section II. In system sections VII and VIII, the procedure is as in system sections III and IV. Those process steps are then repeated, beginning with process step I so that the float loops 7 and 7a are each arranged in displaced relationship.

Figure 9:
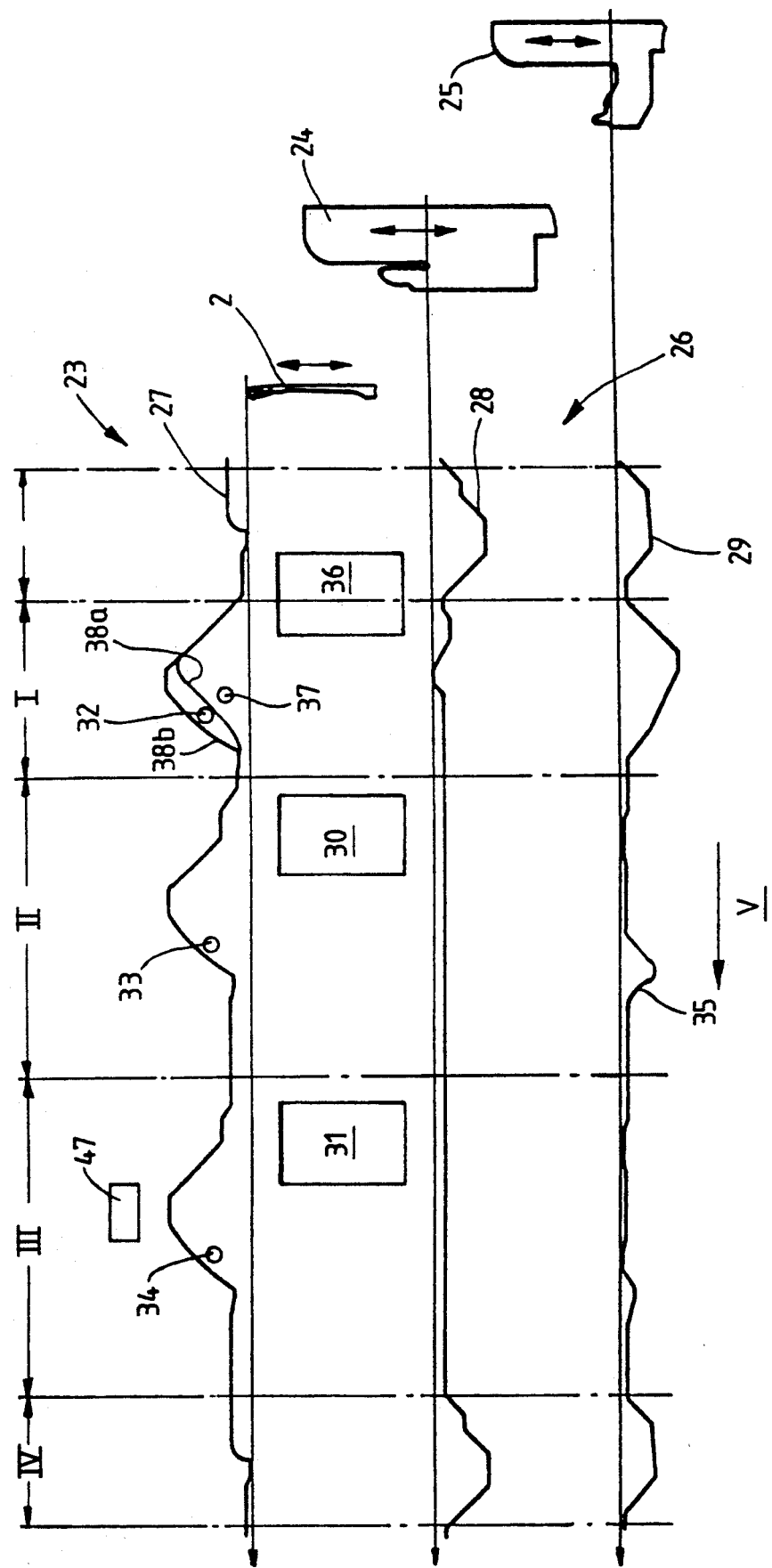
FIG. 9 is a diagrammatic view of a needle and sinker cam of a circular knitting machine which is suitable for the production of the plush knitted fabrics shown in FIGS. 1 to 8, FIG. 10 diagrammatic shows a section of a pile knitted fabric according to the invention with three-colour Jacquard patterning.

A circular knitting machine which is fundamentally suitable for the production of the described plush knitted fabric is described and illustrated in U.S. Pat. No. 4,612,784, to the entire disclosure of which reference is therefore expressly directed for the avoidance of repetition. In regard to describing the process steps which are important herein attention will therefore only be directed to the cam and yarn guide arrangement of the known circular knitting machine, which is shown in FIG. 9 and which is suitable for the purposes of the present invention.

In accordance therewith the cylinder and sinker cam has at least one knitting system with four juxtaposed system sections I to IV through which pass the diagrammatically indicated knitting needles 2 which are in the form of latch needles, in the direction indicated by an arrow v. The needles 2 are displaceably mounted in a preferably rotatably needle cylinder (not shown) which is surrounded by a preferably stationary cylinder cam 23. Arranged in a sinker ring (not shown) which is also preferably rotatably are respective pairs of diagrammatically indicated holding-down sinkers 24 and plush yarn knock-over sinkers 25 which are controlled by a preferably stationary sinker cam 26. The needles 2 are moved on a cylinder cam configuration 27, the holding-down sinkers 24 are moved on a first sinker cam configuration 28 and the knock-over sinkers 25 are moved on a second sinker cam configuration 29. Finally, associated with the system sections II and III are respective selector devices 30 and 31 for the needles 2 and associated with the system sections I to III are respective yarn guides 32, 33 and 34 respectively.

The described circular knitting machine is suitable for the production of the plush knitted fabric shown in FIG. 1 and operates substantially in the following manner. In the first system section I, all needles 2 are raised in known manner in order to receive the first basic yarn which is supplied with the yarn guide 32. In that situation the holding-down sinkers 24 are disposed in the usual advanced position while the knock-over sinkers 25 are retracted somewhat in order to provide the necessary space for the yarn guide 32. After receiving the first basic yarn all needles 2 are moved into an intermediate position (tuck on the needle) in order thereby to provide for preliminary sinking of the first basic yarn over the upper edges of the holding-down sinkers 24 to form loops. The knock-over sinkers 25 are then advanced in order to hold down the basic yarn on the upper edge of the holding-down sinkers 24 when selected needles 2 in the system section II are extended again.

In the system section II only each second needle 2 is extended by means of the selector device 30 in order for the second basic yarn to be introduced into the head of the needle by means of the yarn guide 33. The knock-over sinkers are retracted again somewhat just before that along a cam portion 35 in order to provide the space required for the yarn guide 33. The needles are then moved again into the intermediate position in order also to provide for preliminary sinking of the second basic yarn. All needles 2 now contain the first basic yarn while each second needle 2 additionally contains the second basic yarn (see FIG. 1, course A).

In the third system section III all needles 2 are again extended by means of the selector device 31 in order to receive a plush yarn at the yarn guide 34. In that situation the knock-over sinkers 25 remain in an advanced position so that, by virtue of the subsequent movement of all needles 2 into the intermediate position, the plush yarn can be subjected to preliminary sinking over the upper edge of the needles to provide long plush loops.

Finally in the fourth system section IV the sinkers 24 and 25 are retracted and all needles 2 are moved down into the knock-over position in order to form either the two-yarn stitches 3 (FIG. 1) from the basic yarn and the plush yarn or the three-yarn stitches 6 from the two basic yarns and the plush yarn.

In other respects the needle and sinker control arrangement is similar to the known control arrangement so that there is no need for a more detailed description herein.

Figure 10:
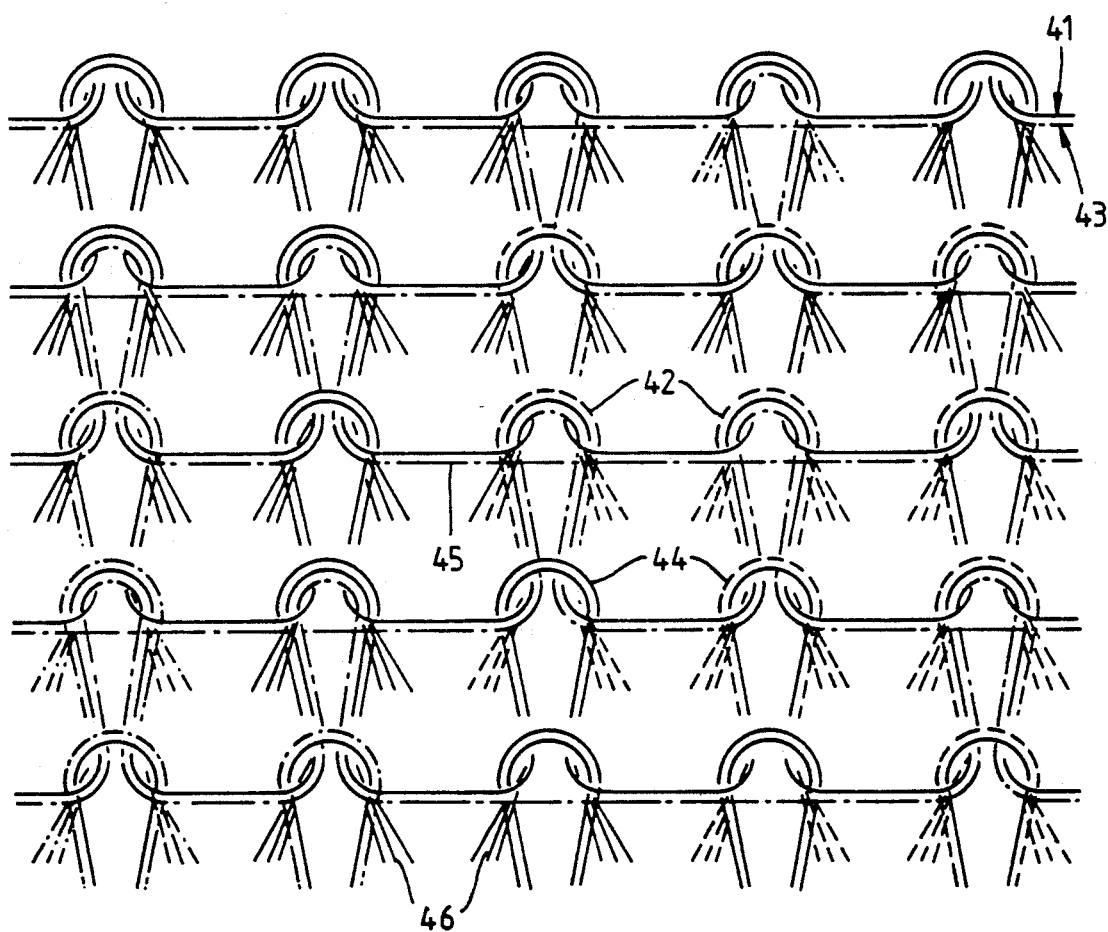

The described circular knitting machine and the production of the plush knitted fabrics which is performed therewith afford the advantage that the two basic yarns are always processed in one and the same course, in other words, do not form any sub-courses. As in particular FIGS. 6, 7 and 10 show, the courses of the basic knit according to the invention are not composed of sub-courses, as would be the case if the second basic yarn is only introduced into selected needles after the first basic yarn has already formed stitches. That is achieved by virtue of the fact that both basic yarns are introduced into the needle hooks in accordance with the pattern before the stitch formation operation is effected with all needles in system section IV. Until system section IV is reached the needles are moved at most into an intermediate position (catch on the needle).

In a subsequent knitting system which comprises four corresponding system sections, needle and sinker control is effected in the same manner except for the different that, by means of the selector device 30, those needles 2 which were selected for receiving yarn in the system section II now remain in the pass-through or non-knitting position while the other needles 2 are extended. In that way the float loops of the second basic yarn, which appear in the course formed in the second system (course B in FIG. 1), are displaced relative to those in course A by a respective needle.

The circular knitting machine described with reference to FIG. 9 is also suitable in a correspondingly modified form for the production of the plush knitted fabrics shown in FIGS. 2 to 5. For the purposes of producing high-low plush fabric as shown in FIG. 2 it is only necessary to select only selected needles 2 for receiving the plush yarn, by means of the selector device 31. If on the other hand a two-colour plush fabric is to be produced, then a fifth section corresponding to the system section III is inserted between the system section III is inserted between the system sections III and IV so that a first plush yarn can be fed to a part of the needles 2 by means of the respective selector device and a second plush yarn can be fed to the other needles. If in that situation not all needles 2 are selected to receive one of the two plush yarns, the result is the plush knitted fabric shown in FIG. 4.

As an alternative to FIG. 9 it is possible for the second basic yarn to be also already introduced into the needles in the first system section I in order thereby to be able to increase the number of knitting systems at the periphery of the needle cylinder. In that case an additional selector device 36 and an additional yarn guide 37 are provided at the first system section. In addition the cylinder cam configuration 27 is subdivided in the falling part thereof into two sections 38a and 38b. The needles 2 which are selected by means of the selector device 36 are actuated for example into the section 38a so that they receive the first basic yarn from the yarn guide 37 whereas the non-selected needles 2 pass into the section 38b in order additionally to receive the second basic yarn which is fed by means of the yarn guide 32. It will be appreciated that the control arrangement may also be reversed so that the selected needles receive both basic yarns and the non-selected needles receive only the first basic yarn. For that purpose, all per se known devices having mechanical or electrical or electromagnetic selector elements may be used in a similar manner as the selector devices. A particularly simple control action can be achieved for example by the needles 2 or plushers associated therewith being provided alternately with upper and lower butts, in which respect in the system section I for example the lower butts are displaced by means of a cam portion providing the section 38a and the upper butts are displaced with a delay by means of a cam portion providing the section 38b, while all needles are extended by means of a respective extension portion acting on the upper and lower butts respectively. In the next system, conversely, a cam portion acting on the lower butts with a delay can form the section 38b and a cam portion acting on the upper butts can form the section 38a of the needle cam configuration. In the yarn run representation shown in FIG. 8, steps I and V would then each be omitted. In addition system section II, as shown in FIG. 9, could then be used for supplying a second plush yarn, in which case the cam section 35 is omitted.

FIG. 10 shows a pile knitted fabric as shown in FIG. 1, but with fibres which can have three different properties as indicated by the different line configurations. The basic knit contains a first basic yarn 41 which forms a stitch 42 in all wales and a second basic yarn 43 which is additionally introduced only in selected stitches 44 and which elsewhere forms float loops 45. Finally fibre tufts 46 are introduced or combed into all stitches. In the specific case the second basic yarn is used in a 2:2-backing(floating) pattern. Apart from that it will be appreciated that the pile knitted fabric may also be of a configuration as shown in FIGS. 2 to 4.

Figure 11:
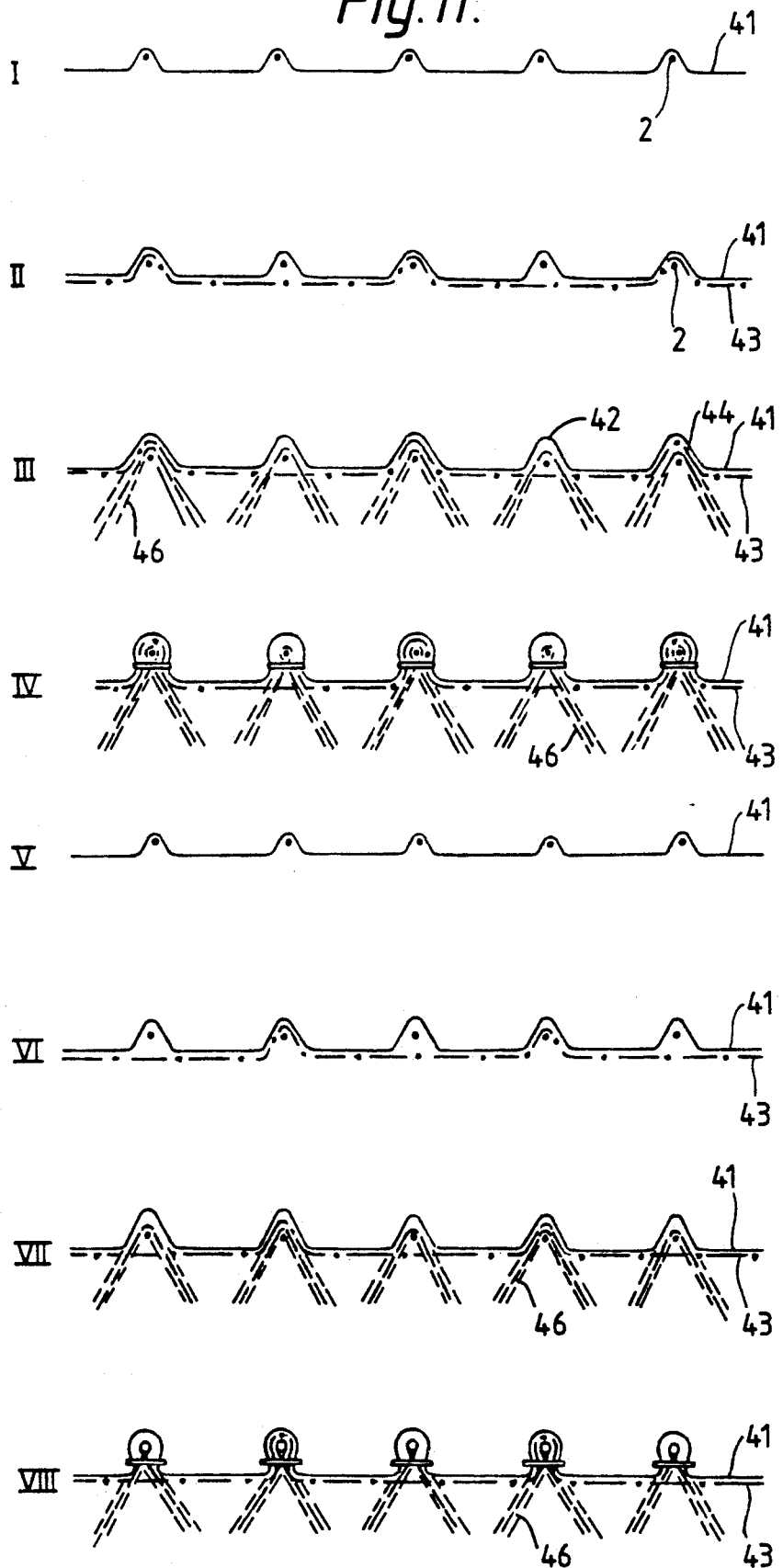
FIG. 11 is a yarn run representation corresponding to that shown in FIG. 8 over two groups each of four knitting systems of a circular knitting machine for the production of a pile knitted fabric without patterning.
Figure 12:
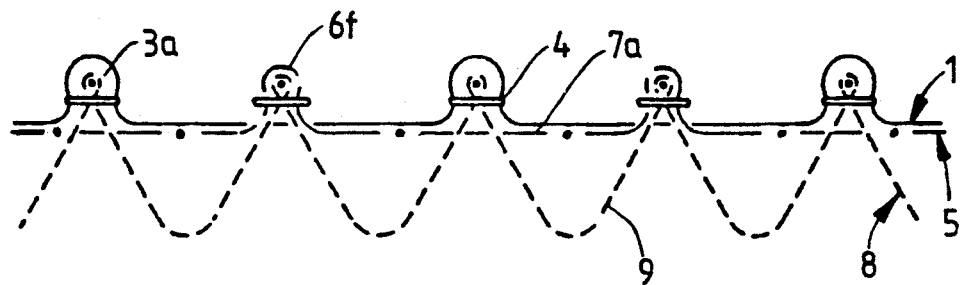
FIG. 12 is a diagrammatic view of a course of a plush knittd fabric wherein a first basic yarn has stitches and floats.
Figure 13A:
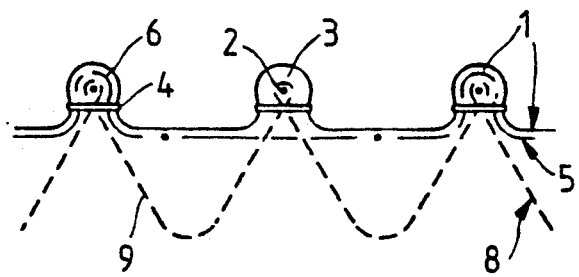
FIG. 13A and 13B are diagrammatic views of two courses of a plush knitted fabric showing the 1:1 stitch/float pattern of a second basic yarn without displacement from course to course.
Figure 13B:
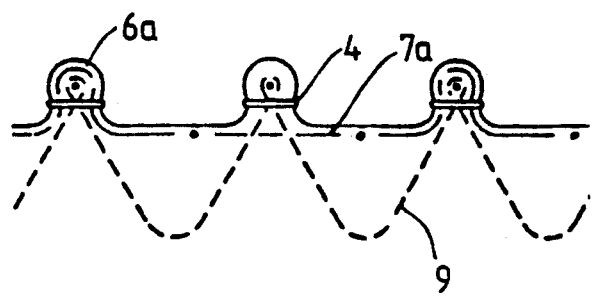
Figure 14:
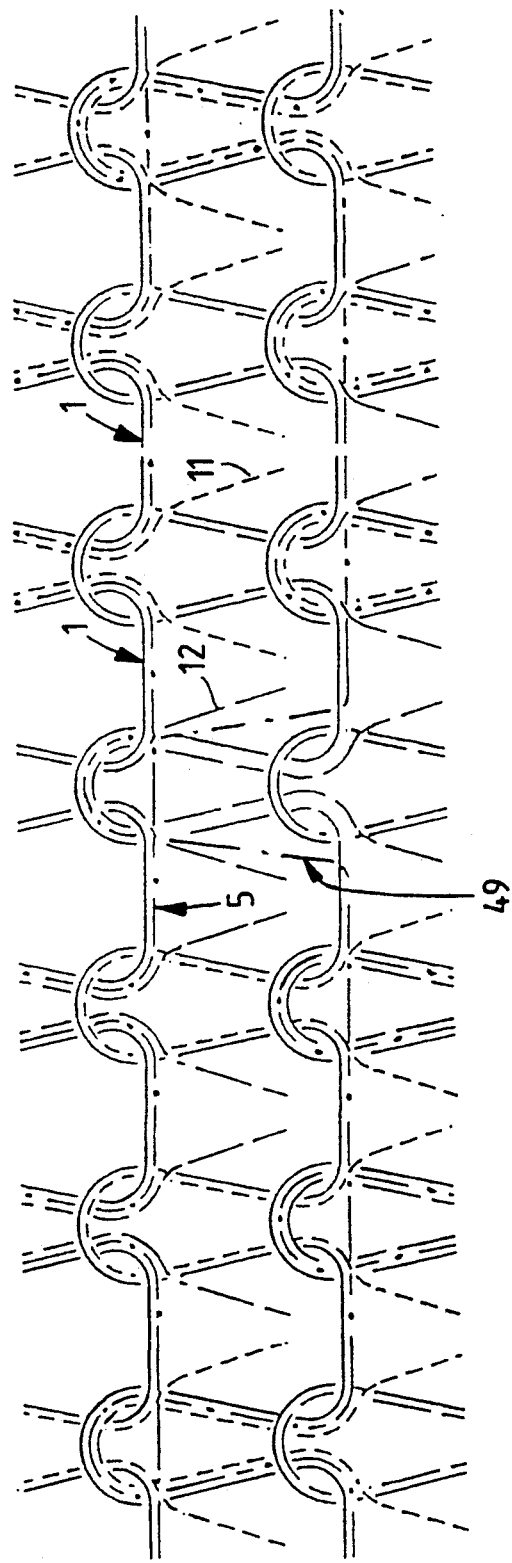
FIG. 14 shows a section of a plush knitted fabric having a second basic yarn with floats extending over more than four stitches and the floats being bound into the fabric by means of tuck stitches.

FIG. 11 shows a yarn run representation for the production of the pile knitted fabric similar to that shown in FIG. 1, when using per se known circular knitting machines (German laid-open application (DE-OS) No. 23 43 886, EP 0 051 059). In that connection it is assumed that the division of the system sections is similar to FIG. 9, that is to say the basic yarns are supplied in the first system sections I or I and II, and the pile fibres are supplied in the system sections III or II and III.

For that purpose, arranged in the region of each of those system sections is for example a respective conventional carding or teasing device, as indicated in purely diagrammatic form in FIG. 8 by reference numeral 47.

The invention is not restricted to the described embodiments which may be modified in many ways. For example it is also possible to make stitches or float loops from the second basic yarn in the ratio 2:1, 1:2, 3:1, 1:3 or the like, while the stitches formed therefrom may be displaced or may be non-displaced in mutually superposed relationship, in successive courses. In is also possible to provide irregular stitch/float loop distributions. In the case of 1:3 or 3:1 patterns, the displacement of the stitches or float loops from one course to another may be by one, two or three wales. Other patterns can also be envisage, while float loops may be bound into the basic knit over four or more wales by catch stitches. In that way, depending on the binding mode for the stitches and float loops of the second basic yarn, the result obtained is basic knits with different structures and/or different stretch properties. If the second basic yarn were bound into the fabric in the knitting mode 1:3 for example instead of 1:1, the result obtained is an entirely different structure, fabric quality and stretch. In addition there is a saving on yarn material as less yarn is consumed for a float loop than for a stitch.

In a corresponding fashion it is also possible for the first basic yarn not to be made into stitches in all wales of all courses of the basic knit and thereby to be allowed partially to float without thereby forming sub-courses. In this alternative configuration also the single-yarn or double-yarn stitches which are formed from only one or two basic yarns form courses which are always undivided. In that connection an at least single-yarn stitch is preferably formed with each knitting needle so that each course is complete and has a stitch for each knitting needle present.

Further alternative configurations may be produced by the second basic yarn being incorporated not into each course of the basic knit but only into every second, third etc. course. In that situation the interposed courses are made exclusively from the first basic yarn, preferably using the plain right/left knitting mode. In that connection the circular knitting machine shown in FIG. 9 affords the particular advantage that a multiplicity of basic knitting patterns can be easily combined with a multiplicity of plush yarn patternings or pile fibre patternings, without substantial alterations having to be made to the circular knitting machine.

It is also possible to supply the second basic yarn in the first system section I and the first basic yarn in the second system section II and to produce plush knitted fabrics or pile knitted fabrics in three or more colours, by the addition of further system sections. Apart from that it will be appreciated that the two basic yarns in all the described situations of use may have the same or different properties.

Finally the second basic yarn which for example is of a different colour may advantageously be incorporated in the manner of a plating yarn so that it covers over the first basic yarn on the front side of the plush or pile knitted fabric. In the case of high-low patterns, that results in basic knit regions with backed-plated front side and unitary right rear side, at locations where there are no plush loops or pile fibre tufts. Alternatively it would also be possible to envisage the provision of plating patterns of plating effects on the rear side.

In any case it will be appreciated that the different properties of the basic yarn can be suitably put to use in the production both of plush fabrics and also pile fabrics and if required can be controlled by further basic yarns. In that connection it is in particular possible to use as one of the two basic yarns an elastic yarn comprising for example rubber, if a dense fabric with certain elastic properties is desired.

While the invention has been illustrated and described as embodied in a plush or pile knitted fabric and circular knitting machine for the production thereof, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A plush or pile knitted fabric comprising a basic knit containing a plurality of courses being formed with at least one first basic yarn, and plush yarns or pile fibres being incorporated into the basic knit and at least one second basic yarn being knitted in selected courses together with the first basic yarn and forming in said selected courses first stitches and first non-plush floats disposed between the first stitches.

2. A plush or pile knitted fabric according to claim 1 wherein the first basic yarn forms in said selected courses second stitches and second floats disposed between the second stitches, the first and second stitches of both basic yarns, respectively, forming undivided courses.

3. A plush or pile knitted fabric according to claim 1 wherein in accordance with a pattern at least a part of the second stitches forms double-yarn stitches with said first stitches.

4. A plush or pile knitted fabric according to claim 2 wherein in accordance with a pattern at least a part of the second stitches forms double-yarn stitches with said first stitches.

5. A plush or pile knitted fabric according to claim 3 the double-yarn stitches formed from both basic yarns (1, 5) are arranged in mutually displaced relationship in different courses.

6. A plush or pile knitted fabric according to claim 3 wherein a second basic yarn is knitted into stitches or is allowed to float in all courses (A, B) in the 1:1 knitting mode, in successive courses the stitches formed from both basic yarns are arranged in mutually displaced relationship and in all courses two plush yarns (11a, 12a) or pile fibres are respectively bound into each stitch in the basic knit or allowed to float alternately in the 1:1 knitting mode.

7. A plush or pile knitted fabric according to claim 6 wherein the stitches formed with the plush yarns are arranged in mutually displaced relationship in successive courses.

8. A plush or pile knitted fabric according to claim 1 wherein the stitches (6, 6a, 6c, 6d) formed from the basic yarns (1, 5) are arranged in mutually displaced relationship in different courses (A, B).

9. A plush or pile knitted fabric according to claim 1 wherein the second basic yarn (5) is incorporated into each course (A, B) of the basic knit.

10. A plush or pile knitted fabric according to claim 1 wherein plush yarns (11, 12; 11a, 12; 15, 16) or pile fibres (46) of different properties are incorporated at least in selected courses (A, B) of the basic knit.

11. A plush or pile knitted fabric according to claim 1 wherein the plush yarns (8; 11, 12; 11a, 12) or pile fibres (46) are bound into all stitches (3, 6, 6a) of the basic knit.

12. A plush or pile knitted fabric according to claim 1 wherein the plush yarns (8, 15, 16) or pile fibres (46) are bound only into selected stitches of the basic knit.

13. A plush or pile knitted fabric according to claim 12 wherein said fabric has regions which are free from plush loops or pile fibres and in which one of the basic yarns is plated.

14. A plush or pile knitted fabric according to claim 1 wherein one of the basic yarns is plated on a rear side of said fabric which rear side is free from plush loops or pile fibres.

15. A plush or pile knitted fabric according to claim 1 wherein the second basic yarn (5) is formed into stitches or allowed to float in a knitting mode selected from a group of knitting modes consisting of 1:1, 2:1, 1:2, 2:2, 3:1 and 1:3.

16. A plush or pile knitted fabric according to claim 15, wherein the stitches of the second basic yarn are displaced by at least one respective course.

17. A plush or pile knitted fabric according to claim 15 wherein the stitches of the second basic yarn (5) are arranged in successive courses in non-displaced relationship.

18. A plush or pile knitted fabric according to claim 1 wherein the floats of the second basic yarn are bound into the basic knit by tuck stitches.

* * * * *